United States Patent
Wittke

(10) Patent No.: US 9,854,314 B1
(45) Date of Patent: Dec. 26, 2017

(54) METHODS AND SYSTEMS FOR RECEIVING RATINGS FROM A THIRD-PARTY SOURCE OF RATINGS

(71) Applicant: Rovi Guides, Inc., San Carlos, CA (US)

(72) Inventor: David Gerald Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/278,372

(22) Filed: Sep. 28, 2016

(51) Int. Cl.
- G06F 3/00 (2006.01)
- G06F 13/00 (2006.01)
- H04N 5/445 (2011.01)
- H04N 21/4722 (2011.01)
- H04N 21/84 (2011.01)
- H04N 21/482 (2011.01)
- H04N 21/858 (2011.01)

(52) U.S. Cl.
CPC ....... H04N 21/4722 (2013.01); H04N 21/482 (2013.01); H04N 21/4825 (2013.01); H04N 21/84 (2013.01); H04N 21/8586 (2013.01)

(58) Field of Classification Search
CPC .. H04N 21/4722; H04N 21/84; H04N 21/482; H04N 21/8586; H04N 21/4825
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2004/0107439 A1* | 6/2004 | Hassell | H04N 5/44591 725/44 |
| 2005/0251827 A1 | 11/2005 | Ellis et al. | |
| 2009/0019488 A1 | 1/2009 | Ruiz-Velasco et al. | |
| 2009/0199237 A1 | 8/2009 | White et al. | |
| 2011/0283304 A1* | 11/2011 | Roberts | H04H 60/46 725/9 |
| 2015/0208120 A1* | 7/2015 | Yao | H04N 21/25833 725/9 |

\* cited by examiner

*Primary Examiner* — Oschta Montoya
(74) *Attorney, Agent, or Firm* — Haley Guiliano LLP

(57) ABSTRACT

Methods and systems are presented for selecting a preferred source of ratings (e.g., Metacritic.com) and integrating the ratings into the electronic program guide (EPG) such as displaying the ratings alongside program listings. By allowing the user to select the source of ratings, the media guidance application ensures that the ratings provided are meaningful to the user. The media guidance application retrieves the ratings from the source of ratings selected by the user and displays the retrieved ratings in the corresponding program listing so that the user may make an informed decision about his or her television viewing. The media guidance application may also incorporate the retrieved ratings into media guidance functions such as setting reminders, scheduling recordings, or recommending programs.

18 Claims, 6 Drawing Sheets

METHODS AND SYSTEMS FOR RECEIVING RATINGS FROM A THIRD-PARTY SOURCE OF RATINGS

BACKGROUND

When scrolling through an electronic program guide (EPG), the user is provided with a wide variety of metadata about each television show, including broadcast dates, actors, and ratings. However, if the ratings are from a source that is outside of the user's control, they may not reflect the user's preferences and expectations, and hence may not be useful. While there are many sources of ratings that the user may consult when doing a separate search (e.g., a specific web site such as Metacritic.com), there is no way to set up an EPG to be populated with ratings from such a user-selected source. Thus, to find ratings for content from the user's preferred source, he or she must instead take the time to go to the individual website and then search for the ratings, an inefficient use of the user's time.

SUMMARY

Accordingly, methods and systems are presented for selecting a preferred source of ratings (e.g., Metacritic.com) and integrating the ratings into the electronic program guide (EPG), such as displaying the ratings alongside program listings. By allowing the user to select the source of ratings, the media guidance application ensures that the ratings provided are meaningful to the user. The media guidance application retrieves the ratings from the source of ratings selected by the user and displays the retrieved ratings in the corresponding program listing so that the user may make an informed decision about his or her television viewing. The media guidance application may also incorporate the retrieved ratings into media guidance functions such as setting reminders, scheduling recordings, or recommending programs.

In some aspects, the media guidance application receives, from a user, a selection of a source of ratings. The source of ratings includes a database of a plurality of ratings, and each rating of the plurality of ratings is associated with a media asset identifier. The source of ratings may be an online ratings provider such as Metacritic.com, Rotten Tomatoes, or Internet Movie Database. In one embodiment, the media guidance application may prompt a user to select the source of ratings by providing an option for text input or a list of suggested options. The media guidance application may receive the user input in the form of text (e.g., "www.Metacritic.com") or the selection of an option in a list of options. The media guidance application may then determine the corresponding source of ratings that matches the user input by either determining the source of ratings connected to the input text, or retrieving from memory the link associated with the selected option. For example, the user may select Metacritic.com from a list of options including Metacritic.com, Rotten Tomatoes, and Internet Movie Database.

The media guidance application automatically stores the selected source of ratings in memory on user equipment. The selection is stored in memory by storing a tag. The tag indicates the source of ratings selected by the user by identifying the source of ratings by name, by including a link to the source of ratings, or by another means. The selection may be stored in association with the specific user by storing the tag indicating the selection with the user profile associated with the user. In some embodiments, the media guidance application may receive from the user, user registration information such as password or other user account information. The media guidance application may then verify the user registration information is valid and store the verified user registration information with any additional information such as a URL linking to the selected source of ratings in the user profile connected to the user. For example, the media guidance application may also store in the user profile, in addition to the tag indicating the user's selection (e.g., Metacritic.com), the URL of the selected source, (e.g., "www.Metacritic.com"), as well as the user's username and password associated with the Metacritic.com account.

The media guidance application accesses the stored selected source of ratings in the memory on the user equipment. The media guidance application may access the stored selected source of ratings by retrieving a link to the selected source of ratings. In some embodiments, the media guidance application may access the user profile and determine the source of ratings associated with the user profile. For example, the media guidance application may access the user profile, and retrieve from memory the tag in the user profile indicating the source of ratings (e.g., metracritic.com), as well as the URL (e.g., "Metacritic.com") and the user registration information (e.g., username and password).

The media guidance application automatically accesses the source of ratings associated with the stored selected source of ratings. The media guidance application may access the source of ratings using the link saved in the form of a URL (e.g., "www.Metacritic.com"). In some embodiments, the media guidance application may access the source of ratings by providing to the source of ratings the verified user registration information (e.g., username and password for a Metacritic.com account).

The media guidance application automatically retrieves a set of ratings associated with the plurality of media asset listings from the source of ratings. The media guidance application may determine a set of media asset listings based on the plurality of media asset listings. The media guidance application may then generate a database query to access the entry of the database corresponding to each media asset listing in the set of media asset listings. In some embodiments, the set of media asset listings is determined based on at least one of the user's viewing history, user's preferences as stored in the user profile, and trending or popular media asset listings. For example, the media guidance application may generate a set of media asset listings including listings for the media assets: "The Simpsons," "Joe Millionaire," Friends," "The Bourne Identity," and "King of the Hill," and then generate a database query to access the corresponding entry of the database for each media asset listing.

The media guidance application receives, from the user, a request to view a plurality of media asset listings. The request from the user may be to view the program listings on the electronic program guide (EPG). The request may be received from a remote control via infrared signals sent to a set-top box or may be received via a mobile application on a tablet or phone.

The media guidance application generates for display the plurality of media asset listings and the set of ratings as requested by the user. The format of the display may be an electronic program guide, recommendation list, schedule for upcoming recordings, or other display of media asset listings. In some embodiments, the rating associated with each media asset listing is displayed with the media asset listing in the electronic program guide. In other embodiments, the media guidance application may provide the broadcast times of only the top-rated media asset listings from the plurality of program listings based on the set of ratings. For example, the media guidance application may generate for display an electronic program guide where every listing in the grid of the program guide includes the title as well as the rating of the show in each slot. In another example, the media guidance application may display a proposed schedule for the evening based on the television shows with the highest rating for each time slot (e.g., the media asset "The Simpsons" on Fox from 7 pm to 7:30 pm and the media asset "Will & Grace" on NBC from 7:30 pm to 8 pm). For media asset listings included in the electronic program guide that do not have an associated rating or for which the rating is a null value, the media guidance application may generate for display an indication that a rating was not found. For example, if the media guidance application does not retrieve a rating associated with the media asset "The Simpsons" from the user-selected source (e.g., Metacritic.com) and instead retrieves a null value, the EPG may display a blank space or replacement character (e.g., "-") indicating that a rating was not found in the user-selected source. As another example, the EPG may display an alternate rating from a default source of ratings (e.g., Rotten Tomatoes). The alternate rating may be visually distinguished (e.g., alternate color, font, or size) to indicate that the rating is not from the user-selected source of ratings.

In some embodiments, the media guidance application may calculate a score for each media asset listing. The score is determined based on the rating of the set of ratings associated with the media asset listing and user preferences. After retrieving the set of ratings from the source of ratings, the media guidance application may calculate a score that integrates the set of ratings with the user preferences in order to customize the ratings that are generated for display. For example, the calculated scores may be generated for display alongside the media asset listings instead of the set of ratings. For another example, multiple ratings (e.g., the rating received from the source of rating and the calculated score) may be displayed with each media asset listing in the electronic program guide.

In some embodiments, the media guidance application may perform a media guidance function based on the set of ratings. The media guidance function may be setting a reminder, scheduling a recording, adding to a list of recommendations, or any other function executed by the media guidance application using a media asset listing as a parameter. The media guidance application may perform the media guidance function on any combination of the media asset listings in the plurality of media asset listings.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
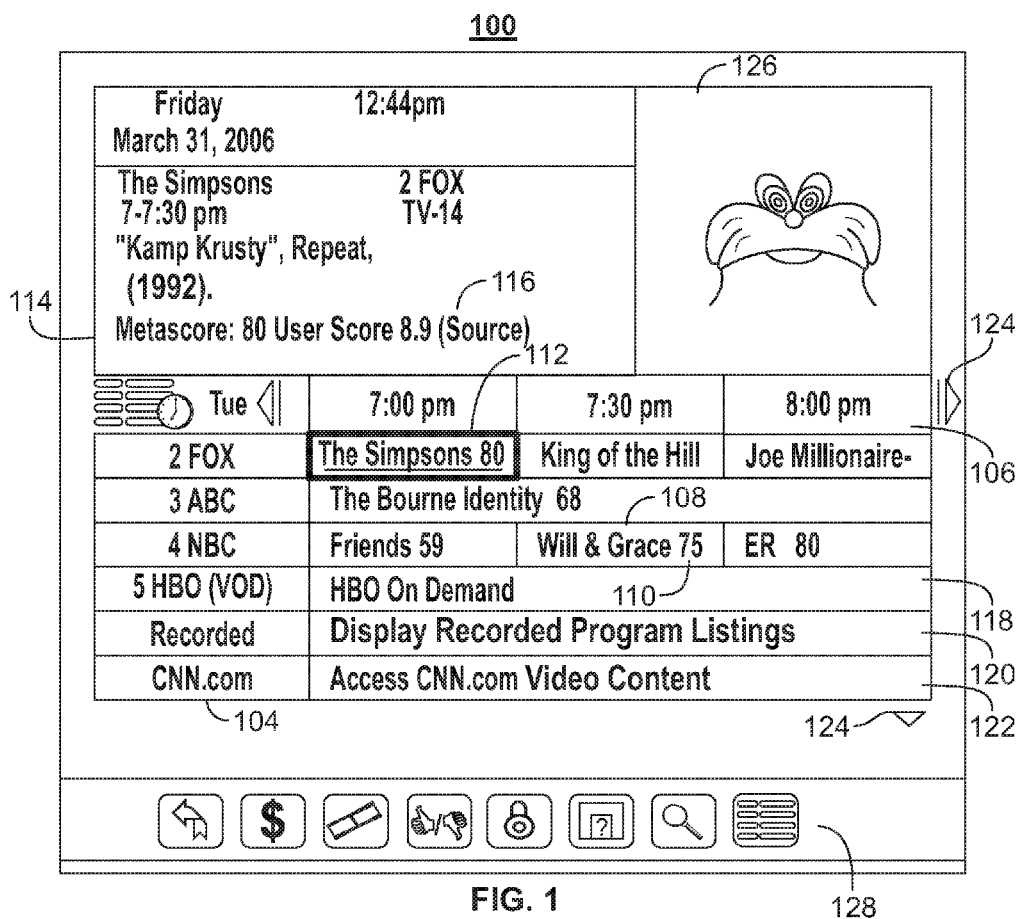
FIG. 1 shows an illustrative example of a display screen generated by a media guidance application, in accordance with some embodiments of the disclosure.

Methods and systems are presented for selecting a preferred source of ratings (e.g., Metacritic.com) and integrating the ratings into the electronic program guide (EPG) such as displaying the ratings alongside program listings. By allowing the user to select the source of ratings, the media guidance application ensures that the ratings provided are meaningful to the user. The media guidance application retrieves the ratings from the source of ratings selected by the user and displays the retrieved ratings in the corresponding program listing so that the user may make an informed decision about his or her television viewing. The media guidance application may also incorporate the retrieved ratings into media guidance functions such as setting reminders, scheduling recordings, or recommending programs.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
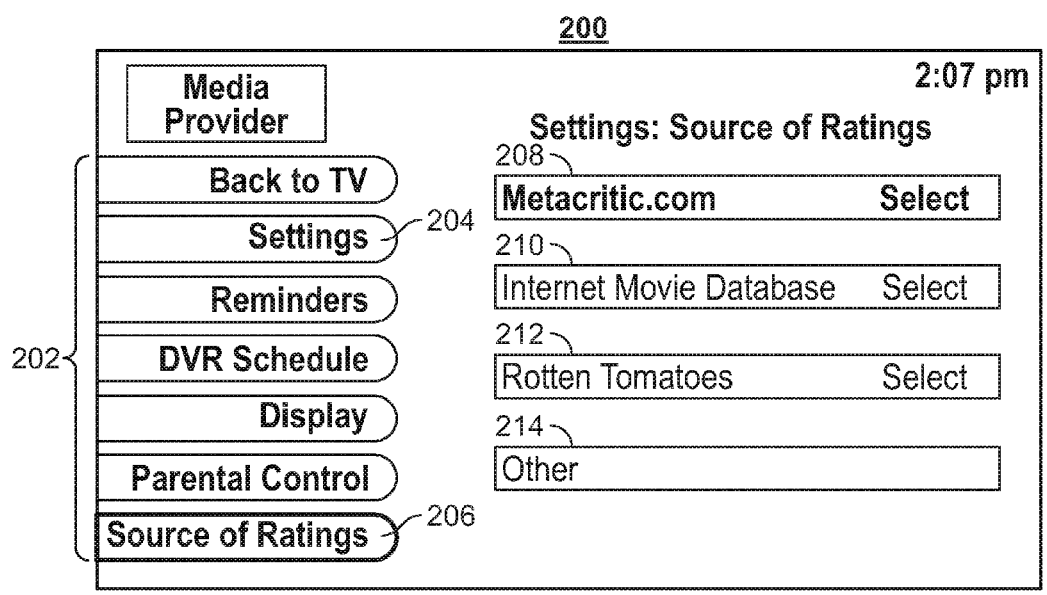
FIG. 2 shows another illustrative example of a display screen for selecting a ratings source generated by a media guidance application, in accordance with some embodiments of the disclosure.

FIGS. 1-2 show illustrative display screens that may be used to provide media guidance data, in accordance with some embodiments of the disclosure. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time as well as the rating 110 associated with the program as retrieved from the third-party source of ratings. With a user input device, a user can select program listings by moving highlight region 112. Information relating to the program listing selected by highlight region 112 may be provided in program information region 114. Region 114 may include, for example, the program title, the program description, the time the program is provided (if applicable), the channel the program is on (if applicable), the program's parental rating, rating 116, and other desired information. Rating 116 is retrieved from the same third-party source of ratings as rating 110 and may match rating 110. Rating 116 may include similar or different information as rating 110. Both rating 110 and rating 116 are retrieved from the user-selected source. In some embodiments, the user-selected source does not include a rating 110 or rating 116 for a specific media asset, and returns a null value for rating 110 or rating 116. If the retrieved rating from the user-selected source is a null value, the media guidance application may retrieve an alternate rating from a default source of ratings and then may assign rating 110 or rating 116 to be the alternate rating from the default source.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time that is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 118, recorded content listing 120, and Internet content listing 122. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 118, 120, and 122 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 124. (Pressing an arrow key on a user input device may affect the display in a similar manner as selecting navigational icons 124.)

Display 100 may also include video region 126, and options region 128. Video region 126 may allow the user to view and/or preview programs that are currently available, will be available, or were available to the user. The content of video region 126 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 128 may allow the user to access different types of content, media guidance application displays, and/or media guidance application features. Options region 128 may be part of display 100 (and other display screens described herein), or may be invoked by a user by selecting an on-screen option or pressing a dedicated or assignable button on a user input device. The selectable options within options region 128 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

FIG. 2 shows a display arrangement for selecting a ratings source generated by a media guidance application. Settings display 200 includes selectable options 202, such as settings menu options 204 and 206. In display 200, settings option 206 is selected, thus providing the settings menu for the Source of Ratings, with Source of Ratings options 208, 210, and 212. If the user wants an option that is not included in Source of Ratings options 208, 210, and 212, option 214, once selected, prompts the user to input the URL of a source of ratings not included in the settings menu. The media guidance application checks the user input by accessing the provided URL and then stores the user input as the user selection.

The media guidance application receives, from a user, a selection of a source of ratings by the user selecting one of options 208, 210, 212, 214. Each of options 208, 210, and 212 represents a possible source of ratings that has been predetermined as a valid source of ratings. For example, option 208 may be Metacritic.com, option 210 may be Internet Movie Database, and Option 212 may be Rotten Tomatoes. Option 214 represents the option for the user to input a source of rating not already listing as one of the predetermined possible options. If the user selects option 214, the media guidance application prompts a user to select the source of ratings by providing an option for text input. The media guidance application may receive the user input in the form of text (e.g., "TheTVDB.com"). The media guidance application may then determine the corresponding source of ratings that matches the user input by determining the source of ratings connected to the input text. If the user selects one of options 208, 210, or 212, the media guidance application retrieves from memory the source of ratings associated with the selected option.

The media guidance application automatically stores the selected option 208 in memory on user equipment. To select an option, the media guidance application stores a tag that indicates the option that was selected. For example, the selected option 208 is stored in memory by storing a tag in the user profile that indicates that the user-selected option 208 (e.g., Metacritic.com). The tag indicates the source of ratings selected by the user by identifying the source of ratings by name, by including a link to the source of ratings, or by another means. In some embodiments, once the user selects option 208, the media guidance application may prompt the user for user registration information such as password or other user account information. Once the media guidance application receives the user registration information, the media guidance application may then verify that the user registration information is valid. The media guidance application may then store the verified user registration information with any additional information such as a URL linking to the selected source of ratings in the user profile connected to the user. For example, the media guidance application may also store in the user profile, in addition to the tag indicating the user's selection (e.g., Metacritic.com), the URL of the selected source, (e.g., "www.Metacritic.com") as well as the user's username and password associated with the Metacritic.com account.

The media guidance application accesses the stored selected source of ratings in the memory on the user equipment. The media guidance application may access the stored selected source of ratings periodically, or in response to user input. The media guidance application may access the stored selected source of ratings by retrieving a link to the selected source of ratings. In some embodiments, the media guidance application may access the user profile and determine the source of ratings associated with the user profile. For example, the media guidance application may access the user profile, retrieve from memory the tag in the user profile indicating the source of ratings (e.g., metracritic.com), as well as the URL (e.g., "Metacritic.com"), and the user registration information (e.g., username and password).

The media guidance application automatically accesses the source of ratings associated with the stored selected source of ratings. The media guidance application may access the source of ratings using the link saved in the form of a URL (e.g., "www.Metacritic.com"). The media guidance application may access the stored selected source of ratings periodically, or in response to user input. In some embodiments, the media guidance application may access the source of ratings by providing to the source of ratings the verified user registration information (e.g., username and password for a Metacritic.com account).

The media guidance application automatically retrieves a set of ratings associated with the plurality of media asset listings from the source of ratings. The media guidance application may determine a set of media asset listings based on the plurality of media asset listings stored in the media guidance data source 416. The set of media asset listings is determined based on the media asset listings displayed to the user and is a subset of the plurality of media asset listings. The media guidance application may then generate a database query to access the entry of the database corresponding to each media asset listing in the set of media asset listings. In some embodiments, the database may not include an entry corresponding to a media asset listing in the set of media asset listings. If no entry is found in the database, the retrieved rating will be represented by a null value. In some embodiments, if the retrieved rating is a null value, the media guidance application may retrieve an alternate rating associated with the corresponding media asset listing from a default source of ratings. In some embodiments, the set of media asset listings is determined based on at least one of the user's viewing history, user's preferences as stored in the user profile, and trending or popular media asset listings. For example, the media guidance application may generate a set of media asset listings including listings for the media assets: The Simpsons, Joe Millionaire, Friends, The Bourne Identity, and King of the Hill, and then generate a database query to access the corresponding entry of the database for each media asset listing.

The media guidance application receives, from the user, a request to view a plurality of media asset listings. The request from the user may be to view the program listings on the electronic program guide (EPG). The request may include the user requesting to access the program schedule or information about a specific media asset as shown in FIG. 1. The request may be received from a remote control via infrared signals sent to a set-top box or may be received via a mobile application on a tablet or phone.

The media guidance application generates for display the plurality of media asset listings and the set of ratings, as requested by the user. The format of the display may be an electronic program guide, recommendation list, schedule for upcoming recordings, or other display of media asset listings. In some embodiments, the rating (e.g., rating 110 or rating 116) associated with each media asset listing is displayed with the media asset listing in the electronic program guide (e.g., display 100). In other embodiments, the media guidance application may provide the broadcast times of only the top rated media asset listings from the plurality of program listings based on the set of ratings. For example, the media guidance application may generate for display an electronic program guide were every listing in the grid of the program guide includes the title as well as the rating (e.g., rating 110 or rating 116) of the show in each slot. In another example, the media guidance application may display a proposed schedule for the evening based on the television shows with the highest rating (e.g., rating 110 or rating 116) for each time slot (e.g., the media asset "The Simpsons" on Fox from 7 pm to 7:30 pm and the media asset "Will & Grace" on NBC from 7:30 pm to 8 pm). For media asset listings included in the electronic program guide that do not have an associated rating (e.g., rating 110 or rating 116) or for which the rating (e.g., rating 110 or rating 116) is a null value, the media guidance application may generate for display an indication that a rating (e.g., rating 110 or rating 116) was not found. For example, if the media guidance application does not retrieve a rating (e.g., rating 110 or rating 116) associated with the media asset "The Simpsons" from the user-selected source (e.g., Metacritic.com) and instead retrieves a null value, the EPG may display a blank space or replacement character (e.g., "-") indicating that a rating (e.g., rating 110 or rating 116) was not found in the user-selected source (e.g., selected option 208). As another example, the EPG may display an alternate rating from a default source of ratings (e.g., Rotten Tomatoes). The alternate rating may be visually distinguished from the ratings retrieved from the user-selected source of ratings (e.g., via alternate color, font, or size) to indicate that the rating is not from the user-selected source of ratings.

Figure 3:
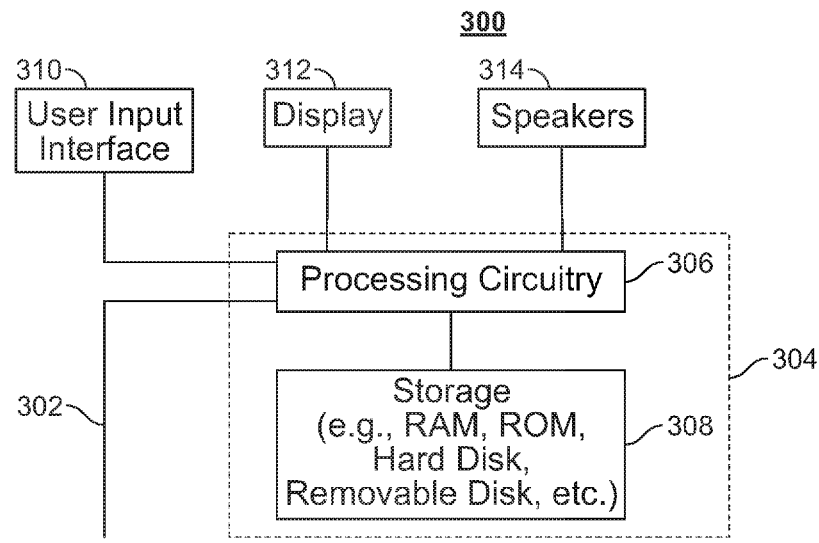
FIG. 3 is a block diagram of an illustrative user equipment device, in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server-based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown) that processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server-based application. Data for use by a thick or thin client implemented on user equipment device 300 is retrieved on-demand by issuing requests to a server remote to the user equipment device 300. In one example of a client-server-based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
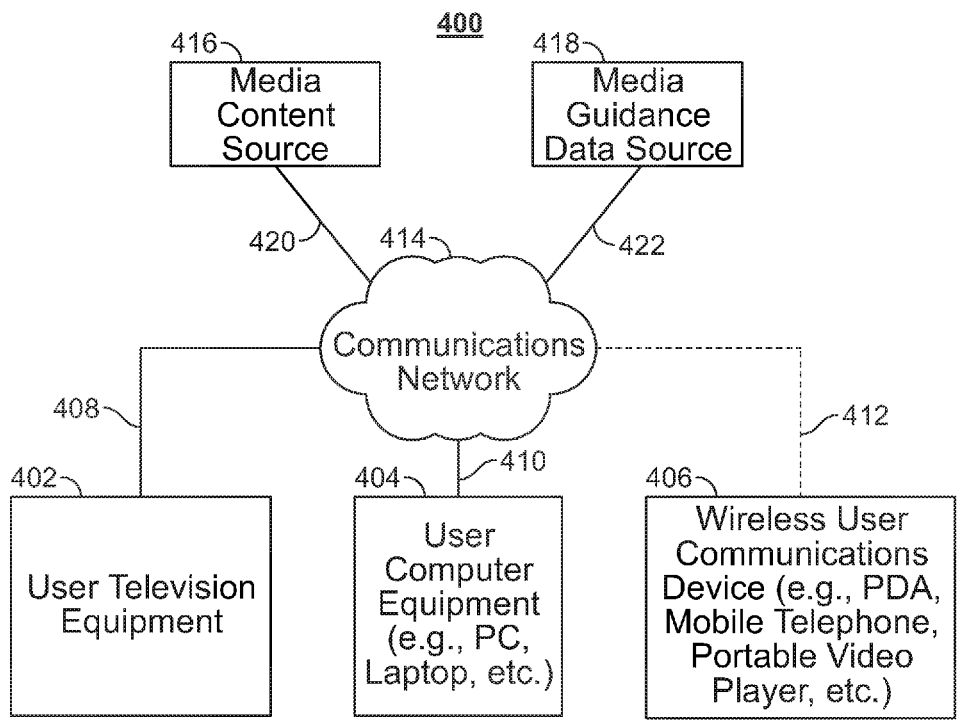
FIG. 4 is a block diagram of an illustrative media system, in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on his personal computer at his office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether it is the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively.

Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions that may be stored in storage 308, and executed by control circuitry 304 of a user equipment device 300. In some embodiments, media guidance applications may be client-server applications where only a client application resides on the user equipment device, and a server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

In some embodiments, the media guidance application receives, from the user, a selected source of ratings indicating a preference for a specific source of ratings to be displayed in the EPG. The media guidance application may save the selected source of ratings in a user profile. If the user navigates the EPG to a schedule of media asset listings, the media guidance application retrieves, from the saved source of ratings, a set of ratings to be displayed alongside the media asset listings in the EPG display.

Figure 5:
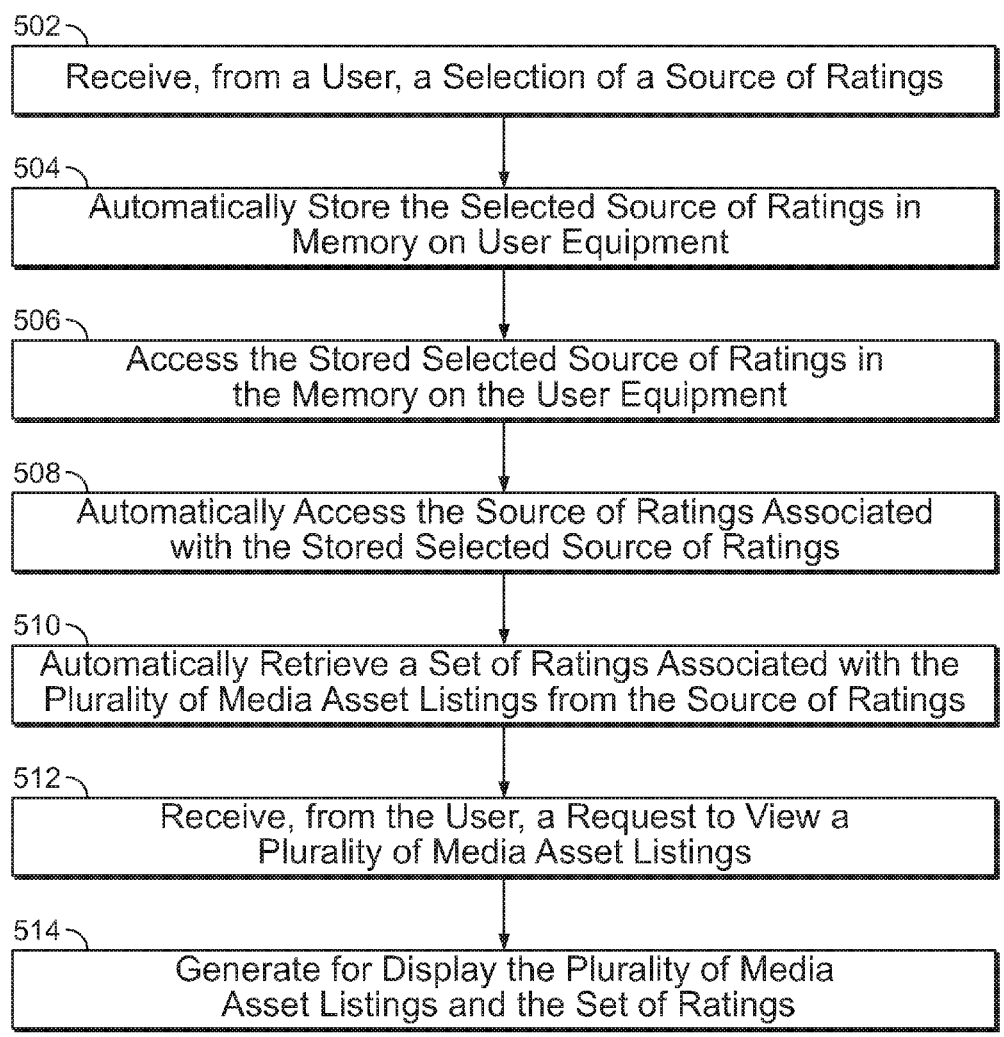
FIG. 5 is a flowchart of illustrative steps for receiving ratings from a third-party source of ratings, in accordance with some embodiments of the disclosure.

FIG. 5 is a flowchart of illustrative steps for receiving ratings from a third-party source of ratings, in accordance with some embodiments of the disclosure.

At 502, the media guidance application receives, from a user (e.g., via user input interface 310), a selection of a source of ratings (e.g., selected option 208). The source of ratings includes a database of a plurality of ratings, and each rating of the plurality of ratings is associated with a media asset identifier. The source of ratings may be an online ratings provider such as Metacritic.com, Rotten Tomatoes, or Internet Movie Database. In one embodiment, the media guidance application may prompt a user (e.g., via display 312) to select the source of ratings by providing an option for text input (e.g., option 214) or a list of suggested options (e.g., options 208, 210, 212). The media guidance application may receive the user input (e.g., via user input interface 310) in the form of text (e.g., "www.Metacritic.com") or the selection of an option in a list of options (e.g., options 208, 210, 212). The media guidance application may then determine (e.g., via control circuitry 304) the corresponding source of ratings that matches the user input by either determining the source of ratings connected to the input text, or retrieving from memory the link associated with the selected option. For example, the user may select Metacritic.com from a list of options (e.g., options 208, 210, 212) including Metacritic.com, Rotten Tomatoes, and Internet Movie Database.

At 504, the media guidance application automatically stores the selected source of ratings in memory on user equipment (e.g., storage 308). The selection is stored in memory by storing a tag (e.g., storage 308). The tag indicates the source of ratings selected by the user by identifying the source of ratings by name, by including a link to the source of ratings, or by another means. The selection may be stored in association with the specific user by storing the tag indicating the selection with the user profile associated with the user. In some embodiments, the media guidance application may receive, from the user (e.g., via user input interface 310), user registration information such as password or other user account information. The media guidance application may then verify (e.g., via control circuitry 304) that the user registration information is valid and store the verified user registration information with any additional information such as a URL linking to the selected source of ratings in the user profile connected to the user. For example, the media guidance application may include in the user profile that the user has selected Metacritic.com by indicating the URL "www.Metacritic.com," as well as the user's username and password associated with the Metacritic.com account.

At 506, the media guidance application accesses (e.g., via control circuitry 304) the stored selected source of ratings in the memory (e.g., storage 308) on the user equipment (e.g., user television equipment 402, user computer equipment 404, or wireless user communication device 406). The media guidance application may access the stored selected source of ratings periodically, or in response to user input. The media guidance application may access the stored selected source of ratings when the media guidance application determines that the user is watching a program and browsing other listings via an overlay. The media guidance application may access the stored selected source of ratings by retrieving a link to the selected source of ratings. In some embodiments, the media guidance application may access the user profile and determine the source of ratings associated with the user profile. For example, the media guidance application may access the user profile, retrieve from memory the tag in the user profile indicating the source of ratings (e.g., metracritic.com), as well as the URL (e.g., "Metacritic.com") and the user registration information (e.g., username and password).

At 508, the media guidance application automatically accesses (e.g., via communication network 414) the source of ratings associated with the stored selected source of ratings (e.g., selected option 208). The media guidance application may access the source of ratings using the link saved in the form of a URL (e.g., "www.Metacritic.com"). In some embodiments, the media guidance application may access the source of ratings by providing to the source of ratings the verified user registration information (e.g., username and password for a Metacritic.com account).

At 510, the media guidance application automatically retrieves (e.g., via communication network 414) a set of ratings associated with the plurality of media asset listings from the source of ratings. The media guidance application may determine a set of media asset listings based on the plurality of media asset listings stored in the media guidance data source 416. The set of media asset listings is determined based on the media asset listings displayed to the user and is a subset of the plurality of media asset listings. For example, if the user is watching a program and browsing other listings via the overlay, the media guidance application may determine a set of media asset listings, including the currently displayed media asset listing, as well as the adjacent media asset listings, so that the media asset listings and retrieved ratings may be available if the user navigates the adjacent listings. The media guidance application may then generate a database query to access the entry of the database corresponding to each media asset listing in the set of media asset listings. In some embodiments, the set of media asset listings is determined based on at least one of the user's viewing history, user's preferences as stored in the user profile, and trending or popular media asset listings. For example, the media guidance application may generate a set of media asset listings including listings for the media assets: "The Simpsons," "Joe Millionaire," Friends," "The Bourne Identity," and "King of the Hill" and then generate a database query to access the corresponding entry of the database for each media asset listing.

At 512, the media guidance application receives from the user (e.g., via user input interface 310) a request to view a plurality of media asset listings (e.g., display 100). The request from the user may be to view the program listings on the electronic program guide (EPG) (e.g., via display 312). The request may include the user requesting to access the program schedule or information about a specific media asset as shown in FIG. 1. The request may be received to display the media asset listings on user television equipment 402, user computer equipment 404, or wireless user communication device 406. The request may be received after the user has selected the source of ratings.

At 514, the media guidance application generates for display (e.g., on display 312) the plurality of media asset listings and the set of ratings (e.g., display 100). The format of the display may be an electronic program guide, recommendation list, schedule for upcoming recordings, or other display of media asset listings. In some embodiments, the rating (e.g., rating 110 or rating 116) associated with each media asset listing is displayed with the media asset listing in the electronic program guide (e.g., display 100). In other embodiments, the media guidance application may provide the broadcast times of only the top-rated media asset listings from the plurality of program listings based on the set of ratings. For example, the media guidance application may generate for display an electronic program guide where every listing in the grid of the program guide includes the title as well as the rating (e.g., rating 110 or rating 116) of the show in each slot. In another example, the media guidance application may display a proposed schedule for the evening based on the television shows with the highest rating for each time slot (e.g., the media asset "The Simpsons" on Fox from 7 pm to 7:30 pm and the media asset "Will & Grace" on NBC from 7:30 pm to 8 pm). For media asset listings included in the electronic program guide that do not have an associated rating (e.g., rating 110 or rating 116) or for which the rating is a null value, the media guidance application may generate for display an indication that a rating was not found. For example, if the media guidance application does not retrieve a rating associated with the media asset "The Simpsons" from the user-selected source (e.g., Metacritic.com) and instead retrieves a null value, the EPG may display a blank space or replacement character (e.g., "-") indicating that a rating was not found in the user-selected source. As another example, the EPG may display an alternate rating from a default source of ratings (e.g., Rotten Tomatoes). The alternate rating may be visually distinguished (e.g., alternate color, font, or size) to indicate that the rating is not from the user-selected source of ratings.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
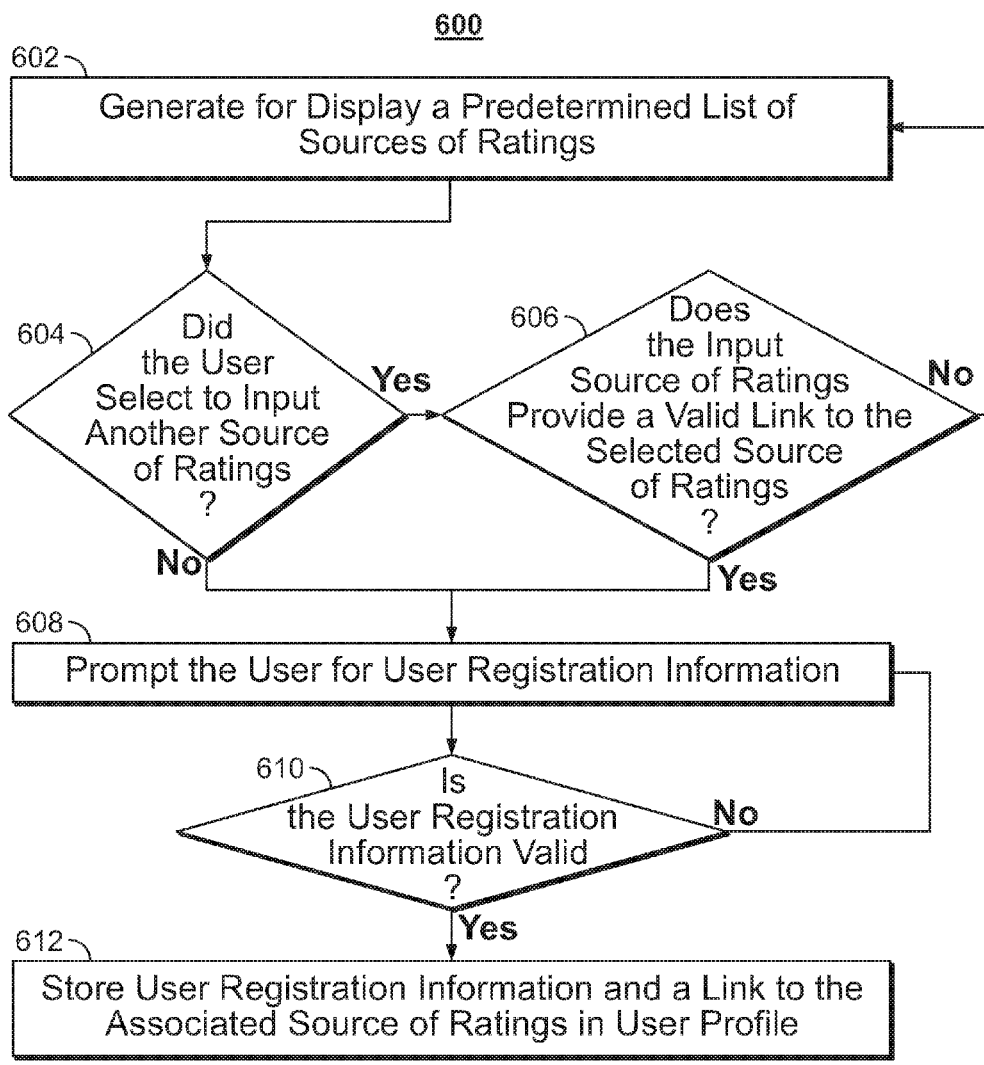
FIG. 6 is a flowchart of illustrative steps for receiving and storing a user selection of a source of ratings, in accordance with some embodiments of the disclosure.

FIG. 6 is a flowchart of illustrative steps for receiving and storing a user selection of a source of ratings.

At 602, the media guidance application generates for display (e.g., on display 312) a predetermined list of sources of ratings (e.g., options 208, 210, 212). The predetermined list of sources of ratings may be a set of online ratings providers, such as Rotten Tomatoes, Internet Movie Database, and Metacritic.com that have been predetermined as options for the sources of ratings. The media guidance application may display (e.g., on display 312) the list of options (e.g., options 208, 210, 212). for the user to select (e.g., via user input interface 310). The media guidance application may also include an option to input a custom Source of Ratings that is not included in the predetermined list (e.g., option 214).

At 604, the media guidance application determines (e.g., via control circuitry 304) whether the user selection was one of the predetermined options (e.g., options 208, 210, 212) or whether the user-selected to input another Source of Ratings (e.g., option 214). If the user did not select to input another Source of Ratings and instead selected one of the predetermined options, process 600 continues to 608. Otherwise, if the user did select to input another Source of Ratings, process 600 continues to 606.

At 606, the media guidance application determines (e.g., via control circuitry 304) whether the input from the user provides a valid link to the Source of Ratings. The media guidance application may determine whether the input from the user provides a valid link to the Source of Ratings by attempting to access the Source of Ratings via Communications Network 414 based on the input provided. If the media guidance application successfully accesses the Source of Ratings via Communications Network 414, the media guidance application determines that the input from the user is valid. If the media guidance application determines that the input from the user provides a valid link to the Source of Ratings, process 600 continues to 608. Otherwise, if the media guidance application determines that the input from the user does not provide a valid link to the Source of Ratings, process 600 continues to 602.

At 608, the media guidance application prompts the user for user registration information (e.g., via display 312). User registration information may include a username and password for a user account associated with the selected Source of Ratings. For example, the media guidance application may ask the user for a username associated with a user account for Metacritic.com, and then ask for a password associated with the username. The media guidance application provides the user with the option to input the requested information (e.g., via user input interface 310).

At 610, the media guidance application determines (e.g., via control circuitry 304) whether the user registration information is valid. The media guidance application may verify that the user registration information is valid by testing the user registration information and accessing (e.g., via communications network 414) the selected Source of Ratings via the user registration information. If the user registration information is valid, process 600 continues to 612. Otherwise, process 600 continues to 608.

At 612, the media guidance application stores user registration information and a link to the associated source of ratings in the user profile (e.g., in storage 308 or media guidance data source 418). The link to the associated Source of Ratings may be a URL.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
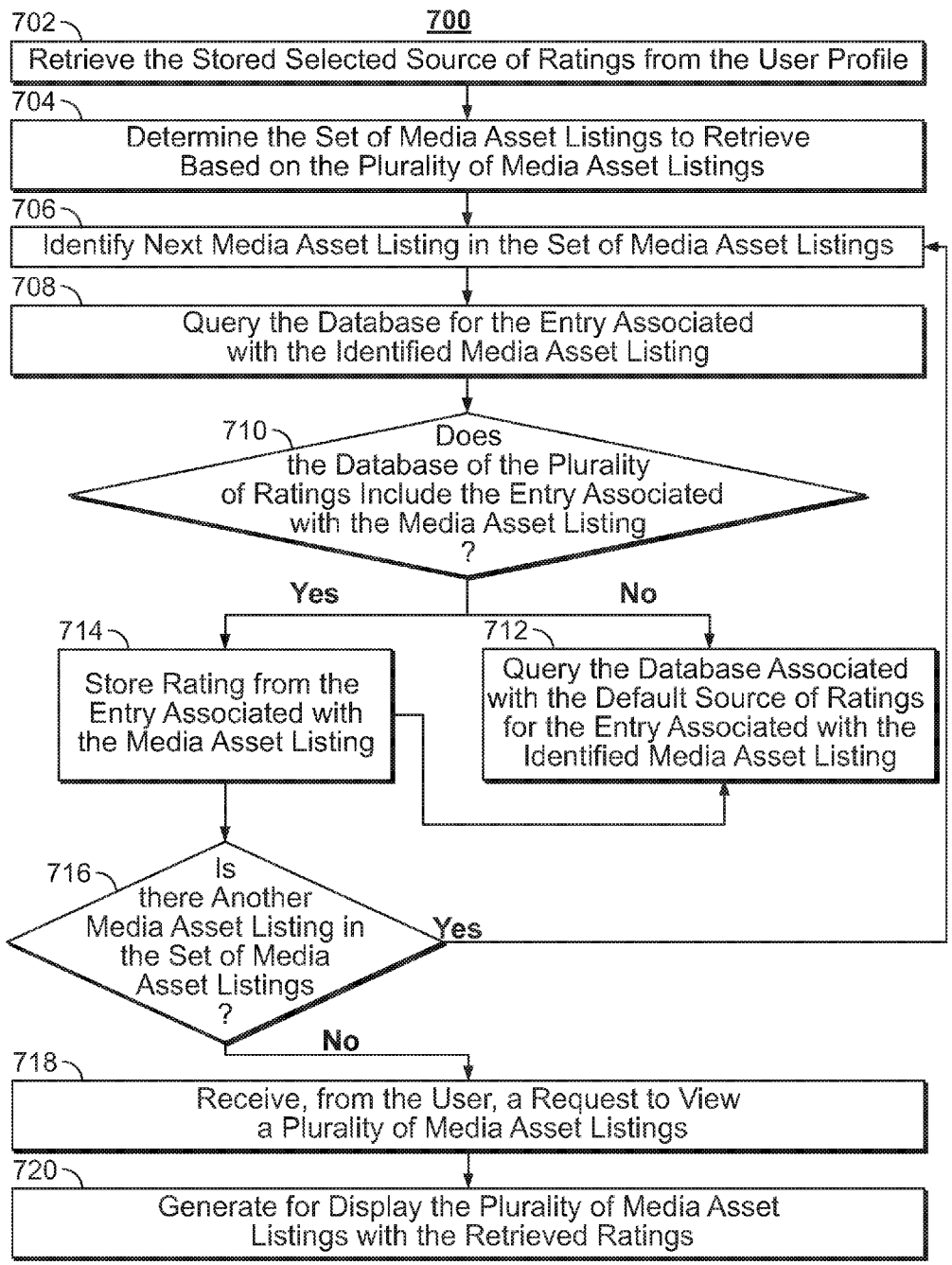
FIG. 7 is a flowchart of illustrative steps for retrieving and generating for display the set of ratings from the source of ratings, in accordance with some embodiments of the disclosure.

FIG. 7 is a flowchart of illustrative steps for retrieving and generating for display the set of ratings from the source of ratings.

At 702, the media guidance application retrieves the stored user selection of a Source of Ratings from the user profile (e.g., storage 308 or media guidance data source 418). For example, the media guidance application may use the user registration information to log into the associated user account with the selected Source of Ratings and then access the Source of Ratings.

At 704, the media guidance application determines the set of media asset listings to retrieve ratings from the user-selected source of ratings (e.g., selected option 208). In some embodiments, the set of media asset listings is determined based on at least one of the user's viewing history, user's preferences as stored in the user profile, and trending or popular media asset listings.

At 706, the media guidance application identifies (e.g., via control circuitry 304) a next media asset listing in the set of media asset listings (e.g., from media guidance data source 418). The set of media asset listings is determined based on the media asset listings displayed to the user and is a subset of the plurality of media asset listings. For example, the media guidance application may access the plurality of media asset listings (e.g., in media guidance data source 418 or media content source 416) and retrieve the next media asset listing in the plurality.

At 708, the media guidance application queries the database for the entry associated with the identified media asset listing. For example, the media guidance application may query the database for a rating associated with the identified media asset.

At 710, the media guidance application determines whether the database of the plurality of ratings includes the entry associated with the media asset listing. If the database of the plurality of ratings in the Source of Ratings does not include an entry for the media asset listing, the retrieved rating will be null. If the media guidance application receives a null value rating, process 700 continues to 712. Otherwise, process 700 continues 714.

At 712, the media guidance application queries the database associated with the default source of ratings for the entry associated with the identified media asset listing. For example, if the retrieved rating from the database associated with the user-selected source of ratings is a null value, the media guidance application may query the database associated with the default source of ratings for the entry associated with the media asset listing so that the media guidance application may retrieve an alternate rating.

At 714, the media guidance application stores (e.g., storage 308 or media guidance data source 418) the rating from the entry associated with the media asset listing. For example, the media guidance application may store the retrieved rating with the metadata associated with the media asset listing in the media guidance data source 418.

At 716, the media guidance application determines whether there is another media asset listing in the plurality of media asset listings. If there is another media asset listing in the plurality of media asset listings (e.g., from media guidance data source 418), process 700 continues to 708. Otherwise, process 700 continues to 718.

At 718, the media guidance application receives from the user (e.g., via user input interface 310) a request to view a plurality of media asset listings (e.g., via display 312). For example, the user may use the remote control to navigate the electronic program guide to the schedule of upcoming broadcasts as shown in FIG. 1.

At 720, the media guidance application generates for display (e.g., on display 312) the plurality of media asset listings with the retrieved ratings. For example, the media guidance application may display the ratings alongside the media asset listings (e.g., on display 312) as shown in FIG. 1. In some embodiments, the media guidance application may display a rating (e.g., rating 110 or rating 116) as a blank space or replacement character (e.g., "-") indicating that a rating was not found in the user-selected source (e.g., selected option 208) for media asset listings for which the retrieved rating was a null value. In other embodiments, the media guidance application may have the default source of ratings search for any media asset listings that could not be found in the user-selected source of ratings (e.g., selected option 208). The media guidance application may, after retrieving the ratings from the user-selected source of ratings (e.g., selected option 208), determine the media asset listings with ratings of null value, and retrieve alternate ratings for each of the media asset listings with ratings of value from the default source of ratings. The media guidance application may then generate for display the alternate ratings. The alternate ratings may be visually distinguished from the ratings retrieved from the user-selected source of ratings (e.g., selected option 208).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for receiving ratings from a third-party source of ratings, the method comprising:
   receiving, from a user, a selection of a source of ratings, wherein the source of ratings includes a database of a plurality of ratings, and wherein each rating of the plurality of ratings is associated with a media asset identifier of a plurality of media asset identifiers;
   automatically storing the selected source of ratings in memory on user equipment;
   accessing the stored selected source of ratings in the memory on the user equipment;
   automatically accessing the source of ratings associated with the stored selected source of ratings;
   automatically retrieving a set of ratings associated with the plurality of media asset identifiers from the source of ratings;
   calculating a score for each media asset identifier, wherein the score is determined solely based on the rating of the set of ratings associated with the media asset identifier and preferences of the user;
   receiving from the user, a request to view a plurality of media asset identifiers; and
   generating for display the plurality of media asset identifiers and the score for each media asset identifier.

2. The method of claim 1, wherein the receiving the selection, further comprises:
   prompting a user to select the source of ratings;
   receiving a user input from the user; and
   determining a corresponding source of ratings that matches the user input.

3. The method of claim 1, wherein the automatically storing the selected source of ratings on user equipment, further comprises storing a link to the selected source of ratings.

4. The method of claim 1, further comprising:
   generating for display, a predetermined list of sources;
   receiving, from the user, user registration information associated with one of the sources of the list of sources; and
   verifying that the user registration information is valid.

5. The method of claim 4, wherein the automatically storing the selected source of ratings on user equipment, further comprises storing the verified user registration information with a link to the selected source of ratings.

6. The method of claim 1, wherein the accessing the stored selected source of ratings, further comprises retrieving a link to the selected source of ratings.

7. The method of claim 6, the link to the selected source of ratings is a URL related to the source of ratings.

8. The method of claim 7, wherein the automatically retrieving a set of ratings associated with the plurality of media asset listings from the plurality of ratings, further comprises:
   determining a set of media asset identifiers based on the plurality of media asset identifiers; and
   generating, for each media asset identifier in the set of media asset identifiers, a database query to access the entry of the database corresponding to each media asset identifier in the set of media asset identifiers.

9. The method of claim 1, further comprising performing a media guidance function based on the set of ratings.

10. A system for receiving ratings from a third-party source of ratings, the system comprising control circuitry configured to:

receive, from a user, a selection of a source of ratings, wherein the source of ratings includes a database of a plurality of ratings, and wherein each rating of the plurality of ratings is associated with a media asset identifier of a plurality of media asset identifiers;

automatically store the selected source of ratings in memory on user equipment;

access the stored selected source of ratings in the memory on the user equipment;

automatically access the source of ratings associated with the stored selected source of ratings;

automatically retrieve a set of ratings associated with the plurality of media asset identifiers from the source of ratings;

calculating a score for each media asset identifier, wherein the score is determined solely based on the rating of the set of ratings associated with the media asset identifier and preferences of the user;

receive from the user, a request to view a plurality of media asset identifiers; and generate for display the plurality of media asset identifiers and the score for each media asset identifier.

11. The system of claim 10, wherein the control circuitry configured to receive the selection is further configured to:
prompt a user to select the source of ratings;
receive a user input from the user; and
determine a corresponding source of ratings that matches the user input.

12. The system of claim 10, wherein the control circuitry configured to automatically store the selected source of ratings on user equipment is further configured to store a link to the selected source of ratings.

13. The system of claim 10, further comprising control circuitry configured to:
generate for display, a predetermined list of sources;
receive, from the user, user registration information associated with one of the sources of the list of sources; and
verify that the user registration information is valid.

14. The system of claim 13, wherein the control circuitry configured to automatically store the selected source of ratings on user equipment is configured to store the verified user registration information with a link to the selected source of ratings.

15. The system of claim 10, wherein the control circuitry configured to access the stored selected source of ratings is configured to retrieve a link to the selected source of ratings.

16. The system of claim 15, the link to the selected source of ratings is a URL related to the source of ratings.

17. The system of claim 16, wherein the control circuitry configured to automatically retrieve a set of ratings associated with the plurality of media asset listings from the plurality of ratings, further comprises:
determine a set of media asset identifiers based on the plurality of media asset identifiers; and
generate, for each media asset identifier in the set of media asset listings, a database query to access the entry of the database corresponding to each media asset identifier in the set of media asset identifiers.

18. The system of claim 10, further comprising control circuitry configured to perform a media guidance function based on the set of ratings.

* * * * *